(12) United States Patent
Erlenmaier et al.

(10) Patent No.: US 6,586,706 B2
(45) Date of Patent: Jul. 1, 2003

(54) LASER MACHINE TOOL WITH BEAM GUIDE

(75) Inventors: Werner Erlenmaier, Gerlingen (DE); Urs Keel, Bad Ragaz (CH)

(73) Assignee: Trumpf Werkzeugmaschinen GmbH + Co. KG, Ditzingen (DE)

( * ) Notice: Subject to any disclaimer, the term of this patent is extended or adjusted under 35 U.S.C. 154(b) by 0 days.

(21) Appl. No.: 10/222,080

(22) Filed: Aug. 16, 2002

(65) Prior Publication Data

US 2003/0034336 A1 Feb. 20, 2003

(51) Int. Cl.$^7$ ............................................... B23K 26/36
(52) U.S. Cl. ................................................ 219/121.67
(58) Field of Search ....................... 219/121.67, 121.68, 219/121.69, 121.72, 121.73, 121.78, 121.82

(56) References Cited

U.S. PATENT DOCUMENTS

| | | | |
|---|---|---|---|
| 4,342,535 A | | 8/1982 | Bartlett et al. |
| 5,089,683 A | | 2/1992 | Stephenson et al. |
| 5,475,196 A | * | 12/1995 | Lisec |
| 5,560,843 A | | 10/1996 | Koike et al. |
| 5,774,981 A | | 7/1998 | Maejima et al. |
| 6,393,687 B1 | * | 5/2002 | Friedrich |

FOREIGN PATENT DOCUMENTS

| | | |
|---|---|---|
| DE | 4411263 A1 | 10/1995 |
| EP | 0476965 A1 | 3/1992 |
| EP | 0559916 A1 | 9/1993 |
| JP | 60199586 A | 10/1985 |
| JP | 60199586 | 10/1985 |
| JP | 0316118 | 7/1991 |
| JP | 05277779 | 10/1993 |
| JP | 08052587 | 2/1996 |
| JP | 11285886 | 10/1999 |

* cited by examiner

Primary Examiner—Samuel M. Heinrich

(57) ABSTRACT

A machine tool for the machining of workpieces by means of a laser beam (13) includes a laser beam generator (12) that is located in an elevated position relative to a beam bender system (19) of a beam trombone (20). The beam bender system (19) of the trombone (20) can be moved under the laser beam generator (12). A beam guide (14) includes a beam-guiding element (15) that is positioned in the path of the laser beam (13) between the laser beam generator (12) and the beam bender system (19) of the trombone (20) and serves to redirect the laser beam (13) emitted by the laser beam generator (12) to the beam bender system (19) of the trombone (20). The beam bender system (19) of the trombone (20) and the laser cutting head (7) can be moved in the direction of a common axis of travel (x-axis) by means of drive units (8, 9, 21) with drive wheels. At least one drive wheel associated with the beam bender system (19) of the trombone (20) and at least one drive wheel associated with the laser cutting head (7) cooperate with at least one common drive shaft that extends in the direction of the common axis of travel (x-axis) of the beam bender system (19) of the trombone (20) and of the laser cutting head (7).

8 Claims, 5 Drawing Sheets

LASER MACHINE TOOL WITH BEAM GUIDE

BACKGROUND OF THE INVENTION

This invention relates to a machine tool for the machining of workpieces by means of a laser beam which includes a laser beam generator, a laser cutting head and a beam guide for directing the laser beam from the laser beam generator to the laser cutting head. The laser cutting head can be moved relative to the laser beam generator during the processing of the workpiece, and the beam guide includes a beam trombone with a beam bender system which, as the laser cutting head is moved relative to the laser beam generator, is itself movable in synchronization with that positional change.

Machine tools of this type have been described earlier in EP-A-0 559 916 and in JP-A-60199586. In both prior art designs, the laser cutting head is positioned on a bridge spanning the workpiece platform to permit movement in the longitudinal direction of the bridge. The bridge on its part can be moved in the transverse direction. The resulting axes of travel of the laser cutting head define a horizontal plane that covers the working area of the laser cutting head. In both machine tools, a beam trombone serves to keep the path of the laser beam, i.e. the distance of travel for the laser-beam from the laser beam generator to the laser cutting head, at a constant length regardless of the relative movement between the laser cutting head and the laser beam generator. This results in uniform cutting performance of the laser beam across the entire operating range of the laser cutting head. For beam switching i.e. redirection, the prior art beam trombones are each equipped with two beam benders i.e. angled deviation mirrors by means of which the laser beam is guided along what is essentially a U-shaped path within the trombone.

In the machine tool of EP-A-0 559 916, the beam bender system is positioned next to the working area of the laser cutting head in a transverse direction relative to, and movable in the longitudinal direction of, the bridge that guides the laser cutting head. In the longitudinal direction of the bridge the laser beam generator is offset relative to the working area of the laser cutting head.

The machine tool of JP-A-60199586 is equipped with two beam trombones, each with its own beam bender system. One of these beam benders moves jointly with the laser cutting head that is guided by the bridge of the machine in the longitudinal direction of the bridge. The second beam bender can be moved with the bridge in the transverse direction of the latter. Viewed in the direction of travel, the bridge is positioned on one side, the laser beam generator on the other side of the bridge. When the bridge is in an end position of its movement relative to the laser beam generator, the beam bender that is movable with the bridge in the transverse direction of the latter, the bridge itself and the laser beam generator will be positioned one behind the other as viewed in the direction of travel of the beam bender and the bridge.

Because of the configuration described above, both of these prior art machine tools have a relatively large footprint.

On the basis of prior art in this field of technology, it is the objective of this invention to provide a more compact machine design, i.e., with a smaller footprint for an equivalent working area.

SUMMARY OF THE INVENTION

It has now been found that the foregoing and related objects may be readily attained in a machine tool for the laser machining of workpieces which include a laser beam generator, a laser cutting head and a beam guide for directing the laser beam from the laser beam generator to the laser cutting head. The laser cutting head is movable relative to the laser beam generator during the machining of the workpiece, and the beam guide includes a beam trombone with a beam bender system. As the laser cutting head is moved relative to the laser beam generator, the beam bender system moves as an adaptive function of such movement of the laser cutting head. In the present invention, the laser beam generator is located in an elevated position relative to the beam bender system of the bottom trombone to permit the beam bender system of the beam trombone to move under the laser beam generator. The beam guide with at least one beam guiding element is positioned in the light path of the laser beam between the laser beam generator and the beam bender system of the beam trombone. It serves to redirect the laser beam emitted by the laser beam generator to the beam bender system of the beam trombone.

The laser beam generator is positioned adjacent the one end of the path of travel of the beam bender system of the trombone, and the beam bender system of the trombone is movable into a position under the laser beam generator. Accordingly, the laser beam generator is positioned in an end zone of the movement of the trombone beam bender and thus near the perimeter of the machine tool and outside the working area of the laser cutting head.

Preferably, the machine tool includes a first guide structure along which the beam bender system of the trombone is movable, and a second guide structure along which the laser cutting head is movable in the direction of a first axis of travel (x-axis). The second guide structure guides the movement of the laser cutting head in the direction of a second axis of travel (y-axis) which extends at an angle relative to the first axis of travel (x-axis). The beam bender system of the trombone is movably guided along the first guide structure on the side of the second guide structure that faces the laser beam generator, and the second guide structure is movable in the direction of the first axis of travel (x-axis) toward the laser beam generator to an end position of its path of travel. When the second guide structure is in the travel end position, the beam bender system of the trombone is moved under the laser beam generator. Thus, when the second guide structure, when in its travel end position, it and the laser beam generator are lined up one behind the other in the common direction of travel of the second guide structure and the beam bender of the beam trombone. Consequently, viewed in that direction of travel, the laser beam generator, the beam bender of the trombone and the second guide structure only take up relatively little space.

Desirably, on the side of the second guide structure facing the beam bender system of the trombone and opposite the second guide structure that occupies its travel end position across from the laser beam generator, the first guide structure has a projection whose length in the direction of the first axis of travel (x-axis) essentially corresponds to the respective dimension of the beam bender system of the trombone and the maximum possible path length over which the beam bender system of the trombone can be moved when the laser cutting head is in motion in the direction of the second axis of travel (y-axis). This permits an appropriately compact system configuration by minimizing the length of the first guide structure.

In a preferred form, the laser cutting head can be moved along a second guide structure which itself is movable jointly with the beam bender of the trombone along a first guide structure. In a preferred design version of the invention, the beam bender of the trombone and the second guide structure are provided with drive units that jointly employ at least one common drive shaft.

The over-under arrangement of the laser beam generator and the beam bender of the trombone makes it possible for the beam bender to move under the laser beam generator to allow a relatively small footprint for the overall system. Moreover, a compact system architecture is also achieved by having the same drive shaft serve to drive both the beam bender of the beam trombone and the laser cutting head.

DETAILED DESCRIPTION OF THE PREFERRED EMBODIMENT

Figure 1:
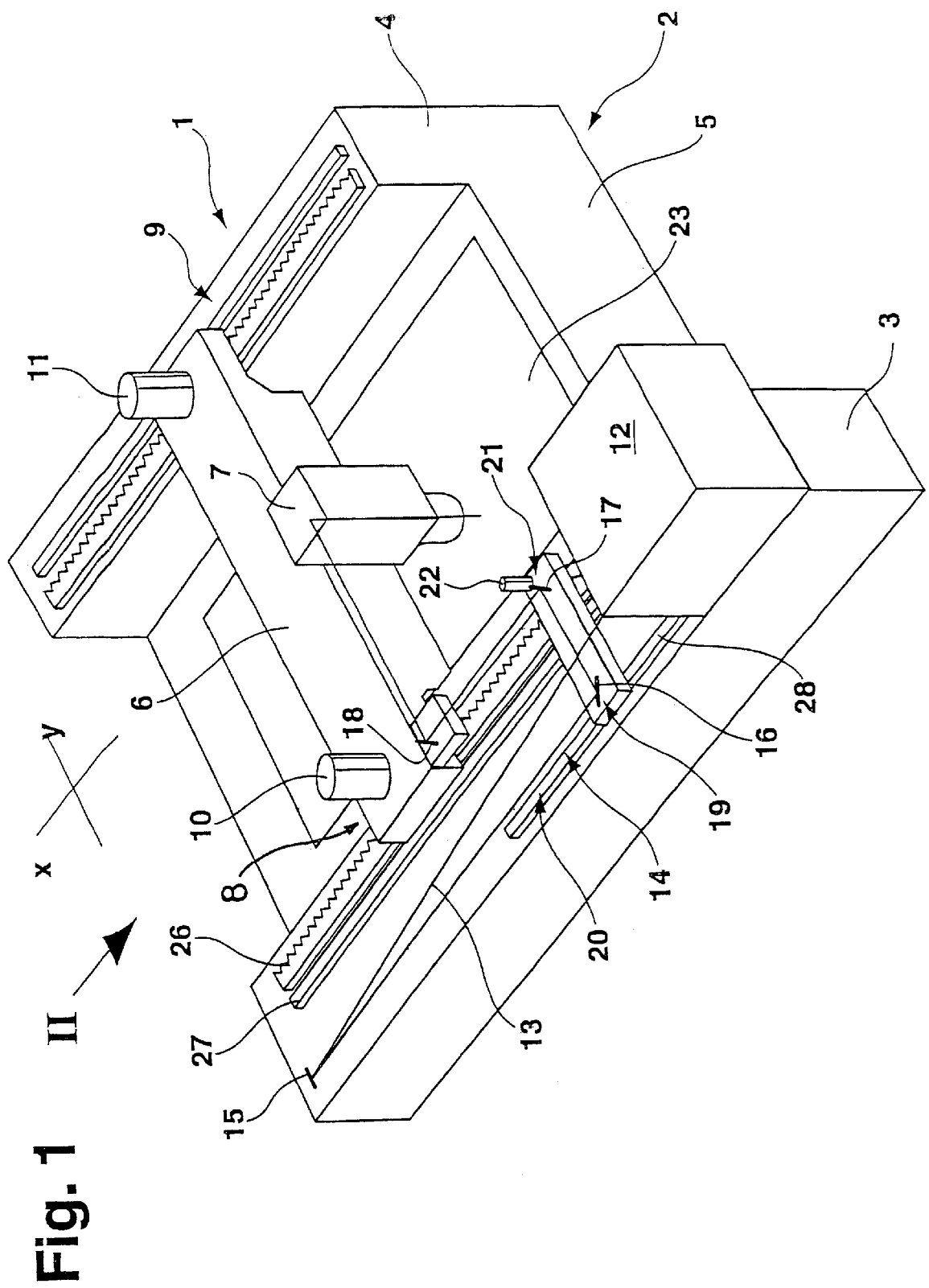
FIG. 1 is a diagrammatic perspective view of a laser-based machine tool including a laser beam generator, a beam trombone with a beam bender system and a bridge supporting the laser cutting head.

As indicated in FIG. 1, a laser-based machine tool, in this case a laser cutting machine 1 includes a machine frame 2 with longitudinal supports 3, 4 and, between them, a workpiece support platform 5. A bridge 6 is movably mounted on the longitudinal supports 3, 4 for movement in the direction of a first axis of travel (x-axis). The bridge 6 in turn movably supports a laser cutting head 7 which is guided thereon for movement in the direction of a second axis of travel (y-axis). Accordingly, the longitudinal supports 3, 4 constitute a first guide structure, and the bridge 6 constitutes a second guide structure.

As described in more detail hereinafter, the drive units 8, 9 with their electric drive motors 10, 11 serve to move the bridge 6, together with the laser cutting head 7 supported by it, in the direction of the x-axis. Another conventional type electric drive unit (not illustrated for simplicity's sake) serves to move the laser cutting head 7 along the bridge 6 in the direction of the y-axis.

A laser beam generator in the form of a $CO_2$ laser 12 is positioned on one of the two ends of the longitudinal support 3. The $CO_2$ laser 12 serves to generate a laser beam 13 which, by means of the beam guide 14, is directed from the $CO_2$ laser 12 to the laser cutting head 7. To that effect the beam guide 14 includes, among other components, the deviation mirrors 15, 16, 17, 18 of which the deviation mirrors 16, 17 are integrated into the beam bender system 19 of the beam trombone 20.

The beam bender system 19 of the trombone 20 is guided along the longitudinal support 3 in the direction of the x-axis and is moved by a drive unit 21 with drive motor 22.

The drive unit 21 of the beam bender system 19 will also be described in more detail hereinafter.

In conventional fashion, the beam trombone 20 serves the purpose of keeping the laser beam 13, i.e. the travel path of the laser beam 13 from the $CO_2$ laser 12 to the laser cutting head 7 or more specifically to the focussing lens in the latter, at a constant length. To that effect, the beam bender system 19 is moved in a direction for a distance which is calibrated to the movement of the laser cutting head 7 during the machining of the workpiece, for instance, the cutting of a metal plate 23 placed on the workpiece platform 5. If, for example, the laser cutting head 7 in FIG. 1 moves a particular distance in the direction of the y-axis toward the longitudinal support 4, the beam bender system 19 will simultaneously travel along the longitudinal support 3 in the direction toward the bridge 6. Since the beam bender 19 "folds" the laser beam 13 in a U-shaped path, the distance that the beam bender 19 must travel to compensate for the movement of the laser cutting head 7 is only half the distance traveled by the laser cutting head 7. In the same fashion, moving the beam bender 19 along the x-axis will compensate for the positional displacement of the laser cutting head 7 when the bridge 6 moves in the direction of the x-axis. Compensating for the bidirectional movement of the laser cutting head 7 by the beam trombone 20 and thus keeping the laser beam 13 at a constant length ensures that the latter retains uniform machining characteristics across the entire working area of the laser cutting head 7.

Figure 2:
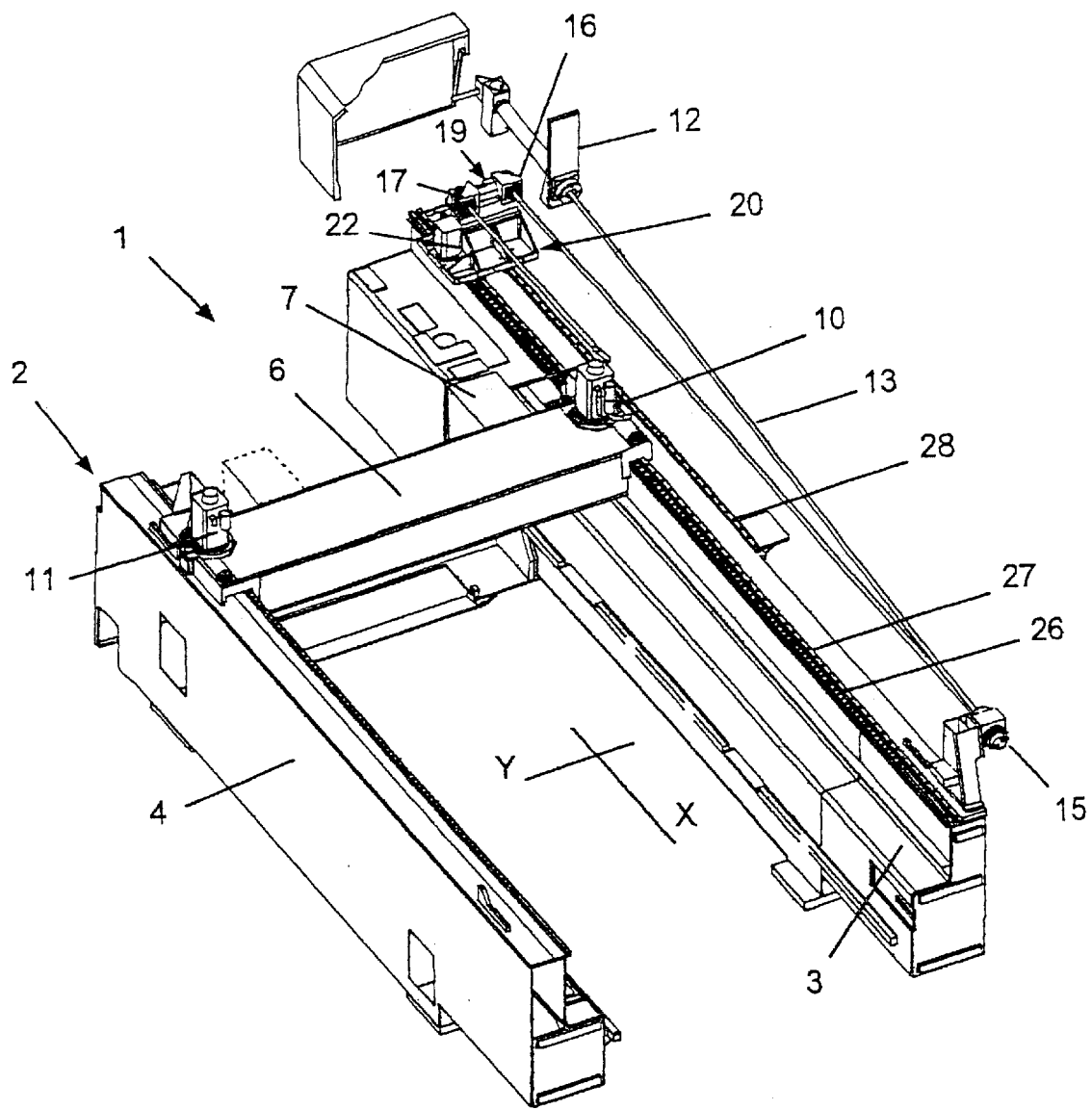
FIG. 2 is a perspective view of the support, drive and beam guidance components of the laser cutting machine of FIG. 1 as viewed in the direction of the arrow II in FIG. 1.

As can be best seen in FIG. 2, the $CO_2$ laser 12 is in an elevated position relative to the beam bender system 19 of the trombone 20. This allows the beam bender system 19 to move under the $CO_2$ laser as it compensates for the positional displacement of the laser cutting head 7. The deviation mirror 15 of the beam guide 14 serves as the beam deflecting element that redirects the laser beam 13 emanating from the $CO_2$ laser 12 to the beam bender system 19.

FIG. 2 shows the beam bender system 19 at one of the end positions of its travel along the x-axis. In this case, the bridge 6 will also be at one of its end positions of its travel in the direction of the x-axis. Along the y-axis the laser cutting head 7 has moved into one of its end positions adjacent the longitudinal support 3. The end position of the laser cutting head 7 at the opposite end of the bridge 6 is indicated in FIG. 2 by a dotted outline. If the laser cutting head 7 were to move from its end position indicated by the solid outline in the direction of the y-axis to its other end position indicated by a dotted outline while the bridge 6 remains in its end position as shown, that positional displacement would have to be compensated for by moving the beam bender system 19 from the end position of its travel shown in FIG. 2, by half the travel path length of the laser cutting head 7, and in the direction of the x-axis toward the bridge 6. In the operating state of FIG. 2, this defines the distance shown between the beam bender system 19 and the bridge 6 in the direction of the x-axis. That distance and the extent of the beam deflection of the beam bender 19 in the x-axis determine the length by which the longitudinal support 3 extends relative to the end position of travel of the bridge 6 as illustrated.

Figure 3:
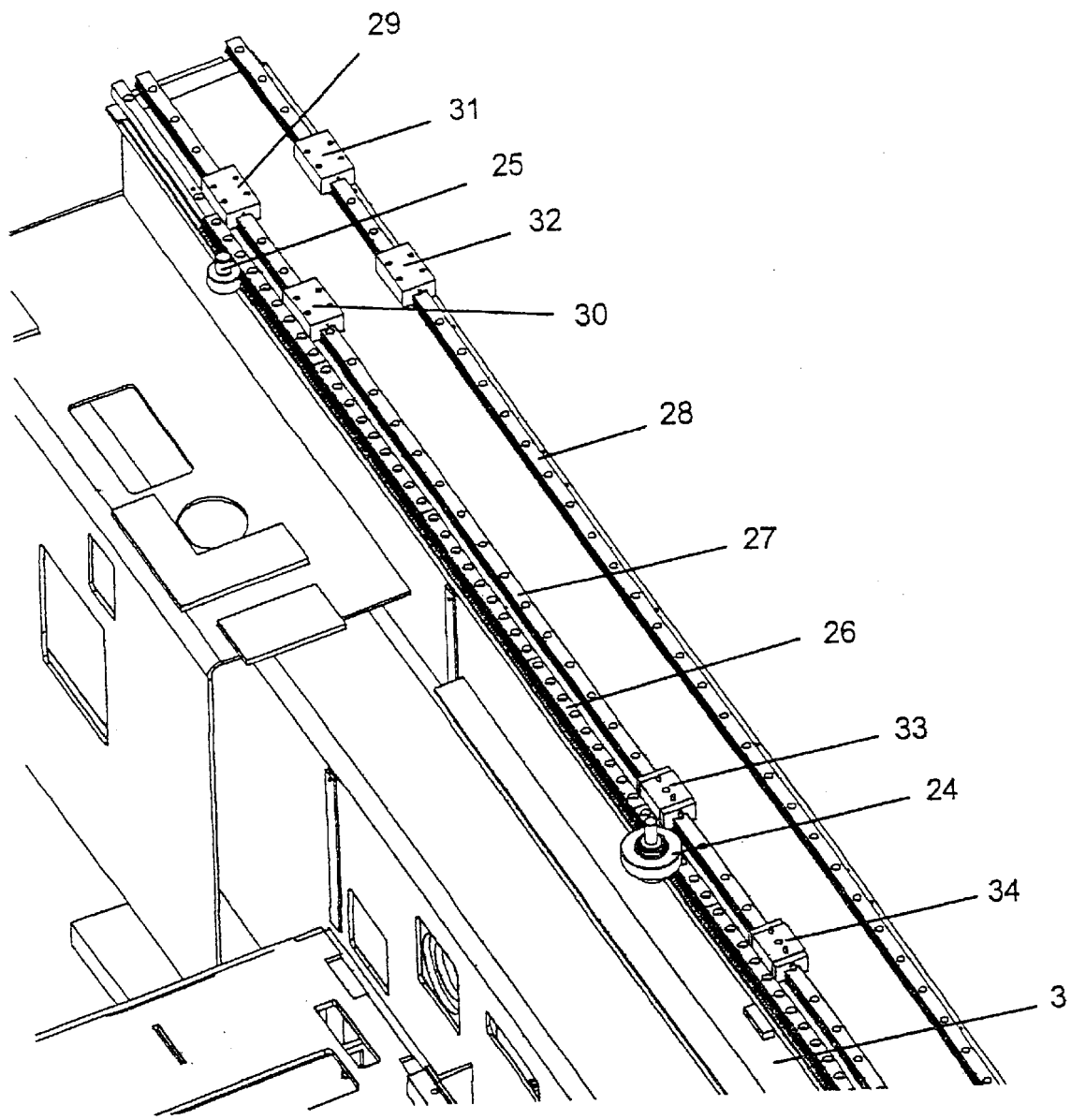
FIG. 3 is an enlarged fragmentary perspective view of the drive and guide systems for the beam bender of the trombone and for the bridge of FIGS. 1 and 2.
Figure 4:
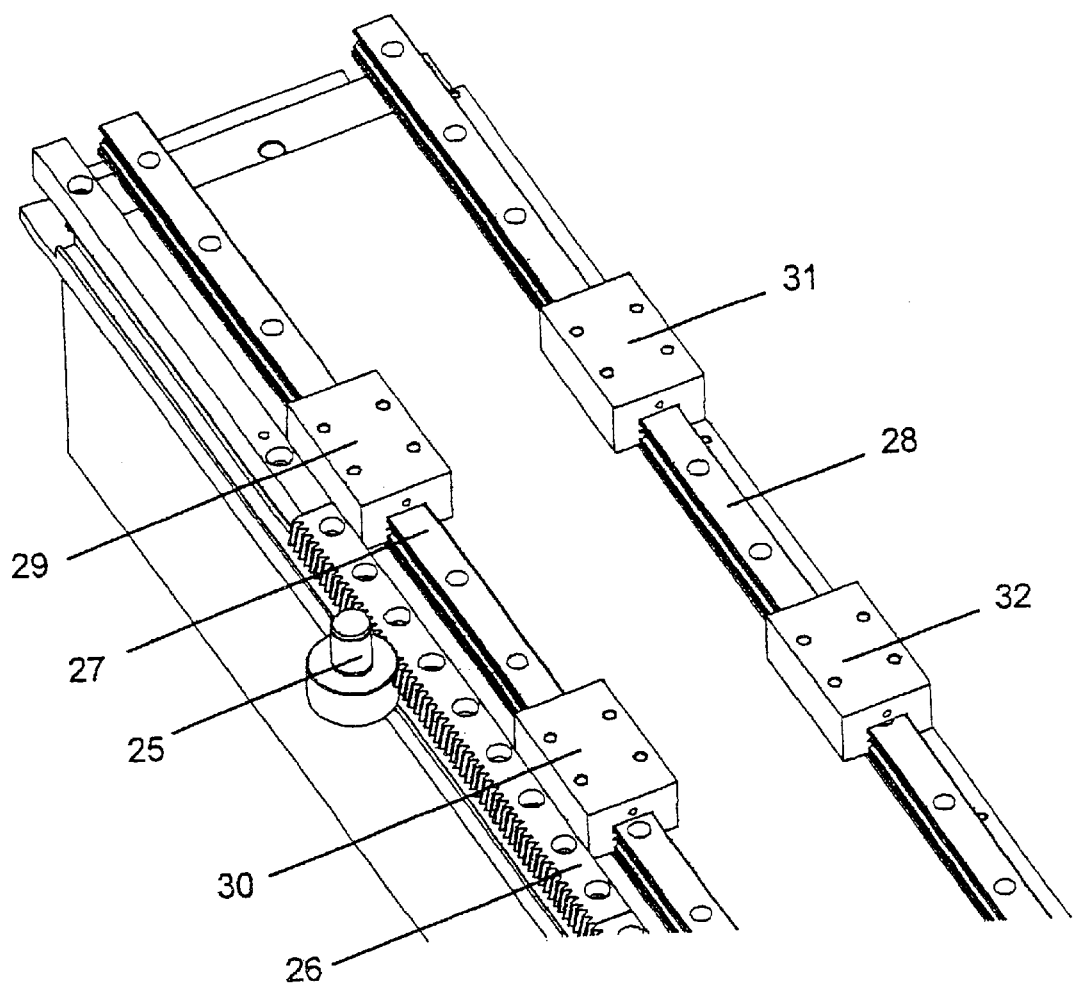
FIG. 4 is an enlarged fragmentary perspective view of the drive and guide systems provided for the beam bender of the beam trombone in FIG. 3.
Figure 5:
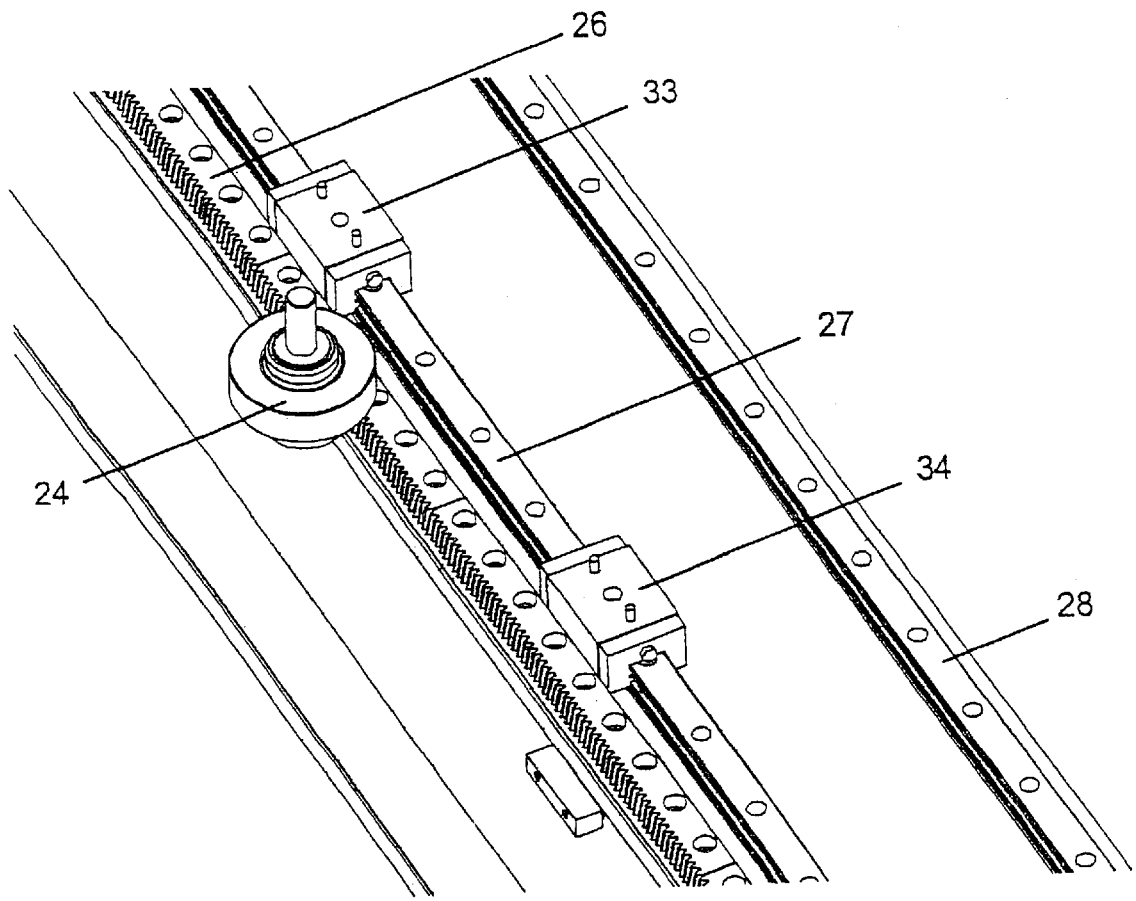
FIG. 5 is an enlarged fragmentary perspective view of the drive and guide systems provided for the bridge in FIG. 3.

Shown in FIGS. 3 to 5 are a drive pinion 24 of drive unit 8 for the bridge 6 and a drive pinion 25 of drive unit 21 for the beam bender system 19. The drive pinions 24, 25 are powered by the electric drive motors 10, 22 and mesh with a shared rack 26 which is bolted to the longitudinal support 3 and extends in the direction of the x-axis.

Extending parallel to the rack 26, the guide rails 27, 28 are similarly bolted to the longitudinal support 3. The guide rail 27 serves as a common track for both the bridge 6 and the beam bender 19 while the guide rail 28 guides the beam bender 19 only. The beam bender 19 travels on the guide rails 27, 28 on the guide trolleys 29, 30, 31, 32, and the bridge 6 travels on the guide rail 27 on the guide trolleys 33, 34. The drive unit 21 for the beam bender system 19 of the trombone 20, the drive units 8, 9 for the bridge 6 and the movement of the laser cutting head 7 are controlled by a CNC control system (not illustrated). The control system permits the drive unit 21 of the beam bender 19 to be controlled in synchronization with the movement of the drive units 8, 9 of the bridge 6 as well as in synchronization with the drive for movement of the laser cutting head 7.

Thus, it can be seen from the foregoing detailed description and the attached drawings that the novel machine tool of the present invention reduces the footprint required for a given working area of the laser cutting head.

What is claimed is:

1. In a machine tool for the machining of workpieces by means of a laser beam (13), including:
   (a) a laser beam generator (12);
   (b) a laser cutting head (7);
   (c) a beam guide (14) for directing the laser beam (13) from the laser beam generator (12) to the laser cutting head (7), said laser cutting head (7) being movable relative to the laser beam generator (12) during the machining of the workpiece, said beam guide (14) including a beam trombone (20) with a beam bender system (19) which, as the laser cutting head (7) is moved relative to the laser beam generator (12), moves as an adaptive function of such movement of said laser cutting, the improvements comprising:
      (A) locating the laser beam generator (12) in an elevated position relative to the beam bender system (19) of the beam trombone (20), to permit the beam bender system (19) of the beam trombone (20) to move under the laser beam generator (12); and
      (B) the beam guide (14) with at least one beam guiding element (15) positioned in the light path of the laser beam (13) between the laser beam generator (12) and the beam bender system (19) of the beam trombone (20) and serving to redirect the laser beam (13) emitted by the laser beam generator (12) to the beam bender system (19) of the beam trombone (20).

2. The machine tool in accordance with claim 1 wherein the laser beam generator (12) is positioned adjacent the one end of the path of travel of the beam bender system (19) of the trombone (20) and wherein the beam bender system (19) of the trombone (20) is movable into a position under the laser beam generator (12).

3. The machine tool in accordance with claim 1 wherein there are included a first guide structure (3, 4) along which the beam bender system (19) of the trombone (20) is movable, and a second guide structure (6) along which the laser cutting head (7) is movable in the direction of a first axis of travel (x-axis), whereby said second guide structure (6) guides the movement of the laser cutting head (7) in the direction of a second axis of travel (y-axis) that extends at an angle relative to the first axis of travel (x-axis), and wherein the beam bender system (19) of the trombone (20) is movably guided along the first guide structure (3, 4) on the side of the second guide structure (6) that faces the laser beam generator (12), that the second guide structure (6) being movable in the direction of the first axis of travel (x-axis) toward the laser beam generator (12) to an end position of its path of travel and wherein, when the second guide structure (6) is in said travel end position, the beam bender system (19) of the trombone (20) is moved under the laser beam generator (12).

4. The machine tool in accordance with claim 3 wherein on the side of the second guide structure (6) facing the beam bender system (19) of the trombone (20) and opposite the second guide structure (6) that occupies its travel end position across from the laser beam generator (12), the first guide structure (3, 4) has a projection whose length in the direction of the first axis of travel (x-axis) essentially corresponds to the respective dimension of the beam bender system (19) of the trombone (20) and the maximum possible path length over which the beam bender system (19) of the trombone (20) can be moved when the laser cutting head (7) is in motion in the direction of the second axis of travel (y-axis).

5. The machine tool in accordance with claim 1 wherein the beam bender system (19) of the trombone (20) and the laser cutting head (7) are each movable by at least one drive unit (8, 9, 21), with at least one drive wheel operatively connected to one of the beam bender system (19) of the trombone (20) and the laser cutting head (7), in the direction of the common axis of travel (x-axis), and with at least one drive wheel associated with the beam bender system (19) of the trombone (20) and at least one drive wheel associated with the movement of the laser cutting head (7) cooperating with at least one common drive shaft that extends in the direction of the common axis of travel (x-axis) of the beam bender (19) of the trombone (20) and of the laser cutting head (7) and which is connected to the frame (2) of the machine tool.

6. The machine tool in accordance with claim 5 wherein there is at least one common drive element is in the form of a toothed rack (26) and at least one drive wheel associated with the beam bender system (19) of the trombone (20) and at least one drive wheel associated with the laser cutting head (7) are drive pinions (24, 25) that mesh with the toothed rack (26).

7. The machine tool in accordance with claim 5 wherein there is included at least one common guide rail (27) is provided on the frame (2) of the machine tool for the beam bender system (19) of the trombone (20) and the laser cutting head (7) said guide rail (27) extending in the direction of the common axis of travel (x-axis) of the beam bender system (19) of the trombone (20) and of the laser cutting head (7) and guiding the beam bender system (19) of the trombone (20) and the laser cutting head (7) in that direction.

8. The machine tool in accordance with claim 5 wherein the beam bender system (19) of the trombone (20) and the second guide structure (6) that supports the laser cutting head (7) can be moved in the direction of the common axis of travel (x-axis) of the beam bender system (19) of the trombone (20) and of the laser cutting head (7) along a first guide structure (3, 4), with the second guide structure (6) guiding the laser cutting head (7) in the direction of a second axis of travel (y-axis), said beam bender system (19) of the trombone (20) and the second guide structure (6) being movable in the direction of the common axis of travel (x-axis) of the beam bender system (19) of the trombone (20) and of the laser cutting head (7) by means of a drive unit (21, 8, 9) including at least one drive wheel operatively connected to one of the beam bender system (19) of the trombone (20) and the second guide structure (6), with at least one drive wheel associated with the beam bender system (19) of the trombone (20) and wherein at least one drive wheel associated with the second guide structure (6) is concurrently moving with one common drive shaft that extends in the direction of the common axis of travel (x-axis) of the beam bender system (19) of the trombone (20) and the second guide structure (6) and is connected to the first guide structure (3, 4).

* * * * *